US008639434B2

(12) United States Patent
Snoeck et al.

(10) Patent No.: US 8,639,434 B2
(45) Date of Patent: Jan. 28, 2014

(54) COLLABORATIVE SHARING WORKGROUP

(75) Inventors: Jeroen Snoeck, Westminster, CO (US); Jeffrey A. Hamilton, Westminster, CO (US); John F. Cameron, Los Altos, CA (US); Benedict J. G. Atkins, Westminster, CO (US); Jeffrey H. Drake, Arvada, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 23 days.

(21) Appl. No.: 13/247,788

(22) Filed: Sep. 28, 2011

(65) Prior Publication Data
US 2012/0310532 A1 Dec. 6, 2012

Related U.S. Application Data

(63) Continuation-in-part of application No. 13/149,364, filed on May 31, 2011.

(51) Int. Cl.
*G06F 19/00* (2011.01)
*G06G 7/70* (2006.01)
*G01S 1/00* (2006.01)
*G06Q 10/00* (2012.01)

(52) U.S. Cl.
USPC ............ 701/117; 701/119; 701/408; 705/305

(58) Field of Classification Search
USPC .................................. 701/117, 119; 705/305
See application file for complete search history.

(56) References Cited

U.S. PATENT DOCUMENTS

| | | | |
|---|---|---|---|
| 4,187,398 A | 2/1980 | Stark | |
| 5,841,026 A | 11/1998 | Kirk et al. | |
| 5,928,306 A | 7/1999 | France et al. | |
| 6,249,245 B1 | 6/2001 | Watters et al. | |
| 6,317,603 B1 | 11/2001 | Allison | |
| 6,324,473 B1 | 11/2001 | Eschenbach | |
| 6,370,475 B1 | 4/2002 | Breed et al. | |
| 6,397,147 B1 | 5/2002 | Whitehead | |
| 6,469,663 B1 | 10/2002 | Whitehead et al. | |

(Continued)

FOREIGN PATENT DOCUMENTS

WO WO 01/50151 A1 7/2001

OTHER PUBLICATIONS

Hada, Hisakazu et al., "DGPS and RTK Positioning Using the Internet", *GPS Solutions*, Springer, Berlin. DE, vol. 4, No. 1, (Jul. 1, 2000),34-44.

(Continued)

*Primary Examiner* — Thomas Black
*Assistant Examiner* — Tyler Paige

(57) ABSTRACT

A collaborative sharing workgroup comprising a plurality of assets is disclosed. An integrated manager module is fixedly coupled with each asset, the integrated manager module comprising an asset systems monitor; a global navigation satellite system (GNSS) position information monitor; and an environment information monitor. In addition, a communications module is fixedly coupled with each asset. The communications module automatically shares information from each integrated manager module to each of the plurality of assets in the workgroup and similarly receives the shared information from each of the plurality of assets in the workgroup. A user guidance module is also coupled with each asset. The user guidance module utilizes the shared information to automatically update guidance information for an asset. Moreover, the user guidance module operates independently on each asset in a workgroup without utilizing a central managing device.

24 Claims, 6 Drawing Sheets

(56) References Cited

U.S. PATENT DOCUMENTS

| | | | |
|---|---|---|---|
| 6,473,032 B1 | 10/2002 | Trimble | |
| 6,529,830 B1 | 3/2003 | Eschenbach | |
| 6,567,041 B1 | 5/2003 | O'Dell | |
| 6,584,095 B1 | 6/2003 | Jacobi et al. | |
| 6,597,311 B2 | 7/2003 | Sheynblat et al. | |
| 6,677,894 B2 | 1/2004 | Sheynblat et al. | |
| 6,741,935 B1 | 5/2004 | Eschenbach | |
| 7,035,650 B1 | 4/2006 | Moskowitz et al. | |
| 7,050,815 B2 | 5/2006 | I'Anson et al. | |
| 7,110,880 B2 | 9/2006 | Breed et al. | |
| 7,187,931 B2 | 3/2007 | Trossen | |
| 7,313,628 B2 | 12/2007 | Chaskar et al. | |
| 7,336,641 B2 | 2/2008 | Kim et al. | |
| 7,362,265 B2 | 4/2008 | Weill | |
| 7,474,896 B2 | 1/2009 | Mohi et al. | |
| 7,480,511 B2 | 1/2009 | O'Meagher | |
| 7,590,720 B2 | 9/2009 | Bahl | |
| 7,613,468 B2 * | 11/2009 | Hamilton et al. | 455/456.1 |
| 7,630,340 B2 | 12/2009 | Jung et al. | |
| 7,711,480 B2 | 5/2010 | Robbins | |
| 7,751,829 B2 | 7/2010 | Masuoka et al. | |
| 7,756,636 B2 | 7/2010 | Kikuchi et al. | |
| 7,911,379 B2 * | 3/2011 | Cameron | 342/357.28 |
| 7,957,748 B2 | 6/2011 | Heater et al. | |
| 7,961,717 B2 | 6/2011 | Lee et al. | |
| 8,014,945 B2 | 9/2011 | Cooper et al. | |
| 8,023,963 B2 | 9/2011 | Yonker et al. | |
| 8,032,300 B2 | 10/2011 | Nadkarni | |
| 8,073,461 B2 | 12/2011 | Altman et al. | |
| 8,085,195 B2 | 12/2011 | Abraham | |
| 8,103,430 B2 | 1/2012 | Aliakbarzadeh | |
| 8,103,438 B2 | 1/2012 | Petrie et al. | |
| 8,311,526 B2 | 11/2012 | Forstall et al. | |
| 8,369,867 B2 | 2/2013 | Van Os et al. | |
| 8,437,693 B2 | 5/2013 | Brown et al. | |
| 2003/0025632 A1 | 2/2003 | Sheynblat et al. | |
| 2003/0055666 A1 * | 3/2003 | Roddy et al. | 705/1 |
| 2003/0195008 A1 | 10/2003 | Mohi et al. | |
| 2004/0006424 A1 * | 1/2004 | Joyce et al. | 701/207 |
| 2004/0096041 A1 | 5/2004 | Beckmann et al. | |
| 2004/0151152 A1 | 8/2004 | Kim et al. | |
| 2004/0166861 A1 | 8/2004 | Trossen | |
| 2005/0010361 A1 | 1/2005 | Runkel et al. | |
| 2005/0064878 A1 | 3/2005 | O'Meagher | |
| 2005/0136845 A1 | 6/2005 | Masuoka et al. | |
| 2005/0137786 A1 | 6/2005 | Breed et al. | |
| 2006/0029020 A1 | 2/2006 | Jung et al. | |
| 2006/0064244 A1 | 3/2006 | Robbins | |
| 2006/0149466 A1 | 7/2006 | Kikuchi et al. | |
| 2006/0227047 A1 | 10/2006 | Rosenberg | |
| 2006/0271290 A1 | 11/2006 | Li | |
| 2007/0005244 A1 * | 1/2007 | Nadkarni | 701/213 |
| 2007/0030841 A1 * | 2/2007 | Lee et al. | 370/352 |
| 2007/0060097 A1 | 3/2007 | Edge et al. | |
| 2007/0066322 A1 | 3/2007 | Bahl | |
| 2007/0200755 A1 | 8/2007 | Hamilton et al. | |
| 2008/0132251 A1 | 6/2008 | Altman et al. | |
| 2008/0248813 A1 | 10/2008 | Chatterjee | |
| 2008/0268870 A1 | 10/2008 | Houri | |
| 2008/0309550 A1 | 12/2008 | Sairo et al. | |
| 2009/0005021 A1 | 1/2009 | Forstall et al. | |
| 2009/0082949 A1 * | 3/2009 | Petrie et al. | 701/119 |
| 2009/0104919 A1 | 4/2009 | Heater et al. | |
| 2009/0143079 A1 | 6/2009 | Klassen et al. | |
| 2009/0186628 A1 * | 7/2009 | Yonker et al. | 455/456.1 |
| 2009/0197617 A1 | 8/2009 | Jayanthi | |
| 2009/0262974 A1 | 10/2009 | Lithopoulos | |
| 2009/0325603 A1 | 12/2009 | Van Os et al. | |
| 2010/0029302 A1 | 2/2010 | Lee et al. | |
| 2010/0069035 A1 | 3/2010 | Johnson | |
| 2010/0075643 A1 | 3/2010 | Cooper et al. | |
| 2010/0182196 A1 | 7/2010 | Abraham | |
| 2010/0205242 A1 | 8/2010 | Marchioro, II et al. | |
| 2010/0216491 A1 | 8/2010 | Winkler et al. | |
| 2010/0273459 A1 | 10/2010 | Stern et al. | |
| 2011/0183606 A1 | 7/2011 | Brown et al. | |

OTHER PUBLICATIONS

Landau, Herbert et al., "Virtual Reference Station Systems", *Journal of Global Positioning Systems, International Association of Chinese Professionals in Global Positioning Systems*, Sydney; AU, vol. 1, No. 2, (2002),137-143.

Intuicom, "RTK Bridge-C", www.intuicom.com/www/datasheets/RTKBridgeC_Dec2009.pdf, (Dec. 2009),2 pages.

Intuicom Inc., "Intuicom RTK Bridge Press Release", www.intuicom.com/www/RTK/rtkBridge.htm, 1 page.

Intuicom Inc., "RTK Bridge-E", http://www.intuicom.com/www/datasheets/RTKBridgeE.pdf, (Dec. 2009),2 pages.

Non-Final Office Action Response, U.S. Appl. No. 10/867,861, (May 23, 2008),7 pages.

* cited by examiner

COLLABORATIVE SHARING WORKGROUP

RELATED APPLICATIONS

The present application is a Continuation in Part of pending U.S. patent application Ser. No. 13/149,364, entitled "METHOD AND SYSTEM FOR EXCHANGING DATA" with the filing date of May 31, 2011, assigned to the assignee of the present invention, and which is herein incorporated by reference in its entirety.

TECHNICAL FIELD

Embodiments of the present technology relate to sharing data between assets in a workgroup.

BACKGROUND ART

Reliability and cost savings in a work environment is usually directly related to management, attention to detail and proper utilization of assets within the work environment. In many work projects, time is also a very critical metric. For example, a road crew may need to repair a bridge and a major roadway will have to be closed in order to perform the repair. As such, it is extremely important that the timing of the work be as short as possible. Moreover, the overall time allotted may be fixed such as overnight, over a weekend, etc.

For example, if a truck full of steel bracing arrives on time but the forklift or crane has not been tasked to offload the material, then the fact that the truck has arrived on time is irrelevant. The work is delayed until the forklift or crane is tasked such that the steel bracing can be unloaded. Thus, asset collaboration can make every difference between a job that is completed on time and a job that is not.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

DESCRIPTIONS OF EMBODIMENTS

Figure 1:
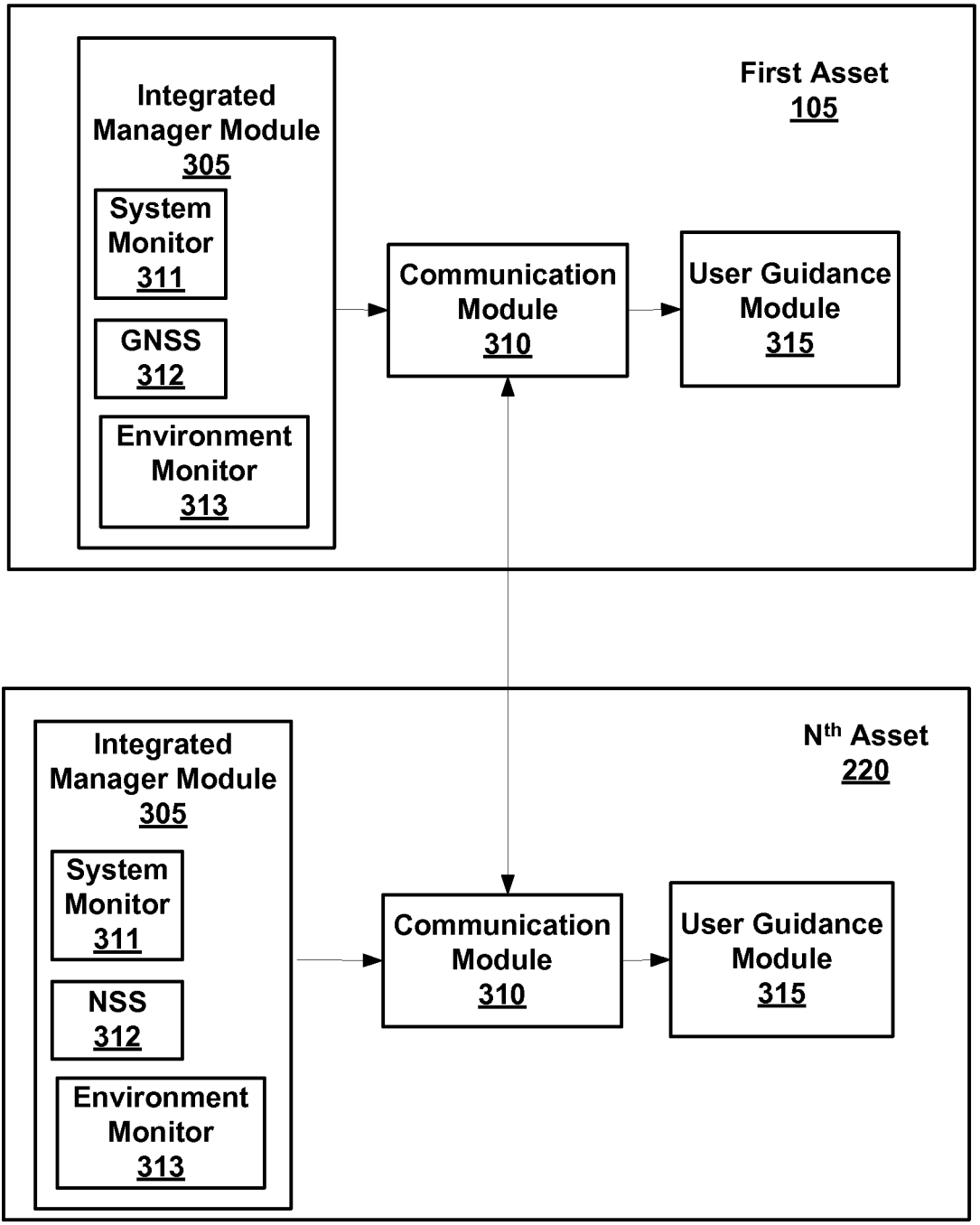
FIG. 1 is a block diagram of a system for sharing data between n assets in a workgroup, according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

In collaborative work an environment consisting of multiple assets and users inter-asset coordination is paramount. By sharing between each asset what each asset has done and is doing, a real-time or near real-time workflow manager at the asset level can provide up-to-date worksite overview that may include a mapping picture on a graphical user interface (GUI) display, automatic updates to the current asset assignment, and the like.

By providing the information to the entire workgroup, a common knowledge pool is established at each asset. In so doing, management is improved and redundancy is reduced.

For example, suppose an area needs to be rolled over with a compactor five times. A first compactor may have already rolled over the area three times before departing for gas, maintenance, etc. When a second compactor arrives at the location, it would not know how many times the area had been rolled. Depending on the type of surface, a safe assumption may be to assume fewer rolls were previously performed and thus perform 4 or 5 additional passes over the area. However, if the surface is one that can be damaged if over rolled, the second compactor may not perform any passes until the number of rolls previously performed can be confirmed.

However, by utilizing the peer-to-peer (P2P), machine-to-machine, or machine-to-person networking described herein, each member of the workgroup shares all information with all other members of the workgroup and creates a real-time localized picture of the worksite information at each asset. Thus, when the second compactor arrives at the area, it would receive, or have already received, the shared data from either the first compactor or else another asset within the workgroup.

The shared data would update the assignment information at the second compactor thereby letting the second compactor know that the area had been rolled three times. The second compactor would then be able to roll over the area two more times to reach the mandated number of five rolls. Additionally, the second roller would share the updated number actions such that, upon its return to service, the first roller would know that the work in the area it had departed from has been properly completed. By having the workgroup shared information, the second compactor saved time and costs by not performing 2-3 additional unnecessary rolls over an area. Moreover, the quality control of the worksite is maintained since the work is based on actual worksite information instead of needing to rely on assumption. In addition, any possible damage due to over-rolling the area is also removed. Also, the surface will not be under-rolled and the contractor will more likely meet the material density specification of the surface owner.

In the present discussion, the term asset is utilized to identify either a vehicle or a handheld device. For purposes of the present discussion a vehicle includes an engine and has an integrated computing system and navigation system fixedly coupled thereto. In other words, the computing system is hardwired to a specific vehicle and removal therefrom would require significant time and effort.

In contrast, a handheld device is a computing system that is user portable. For example, a handheld device may be carried into a vehicle by a user and used in the vehicle by the user, but the handheld device would not require significant time or effort to be installed or operated in a vehicle. In one embodiment, the handheld device may fit in a user's pocket, connect to a belt, be carried in a backpack or the like. In another embodiment, the handheld device may be a standalone asset such as a computing system on the end of a stake. The stake may be placed by a user in a certain location to mark a boundary or object. Handheld devices may run on batteries, connect to an electrical system, or the like. Handheld devices include, but are not limited to smart phones, computer systems, personal digital assistants, laptops, netbooks, handheld electronic devices, routers, navigation systems, etc.

In general, the workgroup described herein applies to any group of assets where the actions of members of the group are important to other members of the group. For example, where the actions of the assets may overlap. A workgroup membership may be established by assets within a specific area of operation. For example, a geofence or other type of boundary may be established. In one embodiment, as an asset passes into the boundary area, it automatically joins the workgroup. As an asset departs the boundary area, it is automatically dropped from the workgroup. In one embodiment, the automatic joining of the workgroup will include an initial broadcast to inform other workgroup members about the joining member. Similarly, the automatic dropping of the asset from the workgroup may include a final broadcast to inform other workgroup assets about the departing member.

An asset may also establish a workgroup membership implicitly. For example, an asset is assigned to a certain area of operation or to a workgroup. In another embodiment, a workgroup membership may be established by assets within a specific range.

In one embodiment, the workgroup has an assigned master, however, in another embodiment the workgroup may have a roaming master that changes as assets enter or leave the workgroup or work area. In yet another embodiment, each asset in the workgroup is part of a peer-to-peer (P2P) network that has no defined master.

Once a workgroup is established, each asset in the workgroup passes information to each of the other assets in the workgroup and receives information from each of the other assets in the workgroup. In other words, information is disseminated to every member of the workgroup instead of being centrally collected at a single asset such as a central server, or the like.

In one embodiment, the workgroup may be an ad hoc network, a micro-net, pico-net, personal area network, local area network (LAN), wide area network (WAN), Internet or the like. Moreover, the network may be established over other wireless connectivity options such as, but not limited to, radio communications, wireless communication, Bluetooth, Wi-Fi, cellular, Internet, etc. Such networking may be typically used for either short range or long range communications.

In one embodiment, the assets in a workgroup experience an initial contact or communication with one another before automatically exchanging data. This initial contact may be known in the art as a handshake. In one embodiment, the mobile devices communication with a presence absence device such as a radio frequency identification (RFID) tag, an RFID tag with Ruby, and/or a Wi-Fi tag.

In one embodiment all assets do all their own computing. In another embodiment, the asset relationship may be a thin or thick client relationship wherein some assets do more computing than other assets within the workgroup. Afterward, the information is provided to each asset in the workgroup. For example, if an asset did not have the computing power to monitor every asset in the workgroup, the 'thin' asset would still be able to receive information important to the operation of the 'thin' asset, thereby maintaining self-autonomy.

With reference now to FIG. 1, a block diagram of a system for sharing data between n assets in a workgroup is shown, according to one embodiment of the present technology. In FIG. 1, a first asset 105 and $n^{th}$ asset 220 are shown for purposes of clarity. However, it should be appreciated that the technology is well suited to more than two assets within a workgroup. The utilization of two assets in FIG. 1 is merely for purposes of clarity.

At FIG. 1, each asset in the workgroup includes similar modules. That is, both first asset 105 and $n^{th}$ asset 220 include integrated manager module 305, communication module 310 and user guidance module 315.

In one embodiment, integrated manager module 305 includes system monitor 311, GNSS 312 and environment monitor 313. In general, integrated manager module 305 is utilized to monitor the asset to which it is coupled. The monitoring includes monitoring of asset specific functionality via system monitor 311, position information via GNSS 312 and environmental data via environmental monitor 313. Integrated manager module 305 provides all the information to communications module 310 for broadcast.

Communication module 310 is utilized to broadcast the information received from integrated manager module 305 and also to receive information from other assets in the workgroup such as $n^{th}$ asset 220. Communication module 310 provides both the information received from integrated manager module 305 and $n^{th}$ asset 220 to the user guidance module 315.

In one embodiment, user guidance module 315 evaluates the received data and compares the information to the tasks presently assigned to first asset 105. The user guidance module 315 then automatically adjusts the tasks assigned to the first asset 105 based on the received information. For example, if first asset 105 is a smart stake, e.g., a stake that includes a location system, computing system, or the like, demarking a first boundary and the received information shows that the first boundary is no longer needed, user guidance module 315 may power down parts of the first asset 105 to save battery life. In so doing, user guidance module 315 automatically responds to workgroup needs and power saving needs without requiring input or requesting permission from a centralized command device.

In another embodiment, user guidance module 315 may automatically update a user interface of an asset to describe, show or otherwise present a consolidated information image based on the operational data received from the workgroup of assets without requiring the use of a central server. For example, instead of the user guidance module 315 automatically updating routing or assignment information for an asset, the user guidance module 315 will automatically provide the consolidated information image to the asset operator who will then be able to manually select or adjust a further course of action for the asset.

Figure 2:
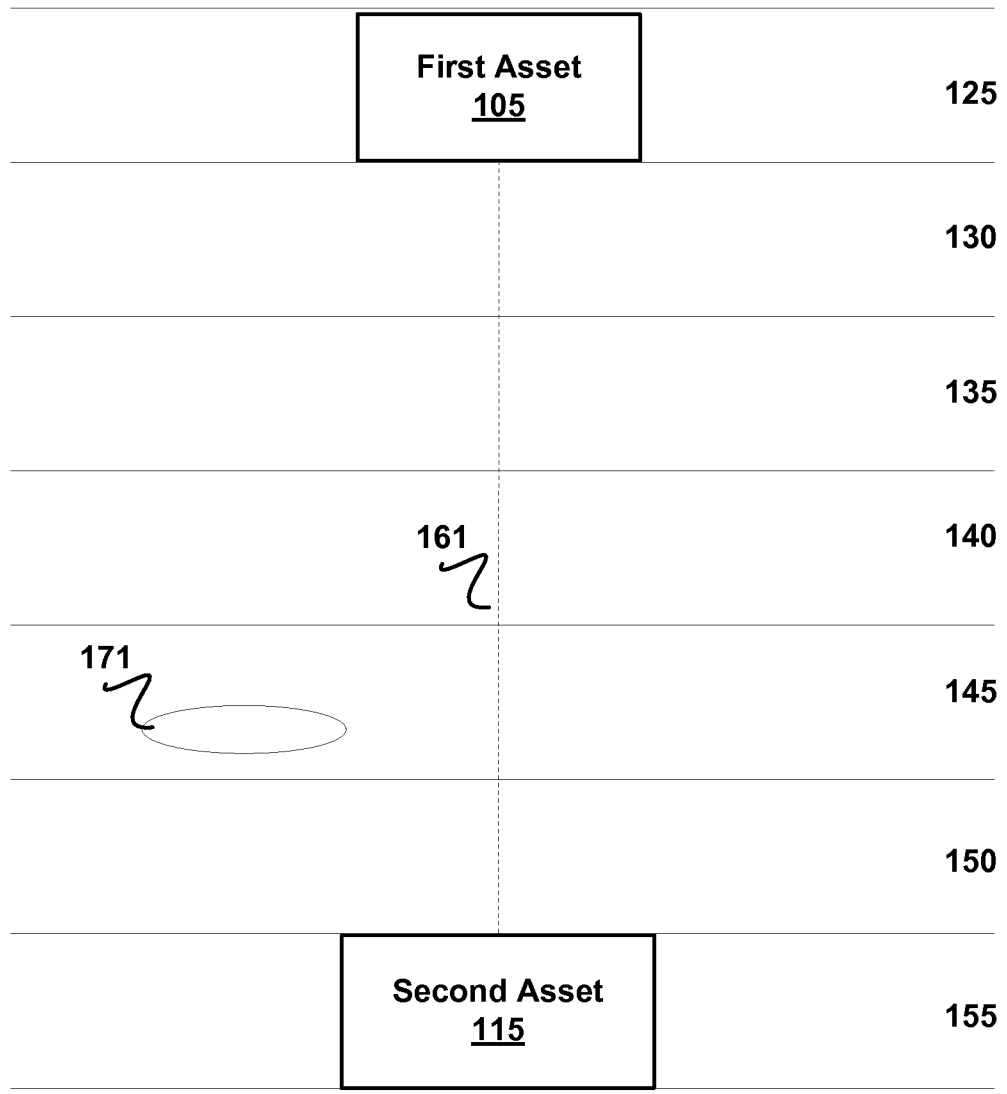
FIG. 2 is a block diagram of a two asset collaborative sharing workgroup, according to one embodiment of the present technology.

With reference now to FIG. 2, a block diagram of a workgroup having first asset 105 and second asset 115 is shown. In the present example, the first asset 105 and second asset 115 in the workgroup are earthworks vehicles and specifically two compactors working collaboratively.

However, it should be understood that the utilization of other assets may also be utilized. For example, first asset 105 and second asset 115 may be other earthworks vehicles such as graters, earth movers, scrapers, excavators and the like, or other vehicles that are not earthworks vehicles such as pavers or the like. In another example, the assets may be agricultural machines such as combines, tractors, threshers, pickers, cutters and the like. In yet another embodiment, the assets may be automated devices such as lawn mowers, vacuuming robots, cleaning automatons, or the like. For example, the assets may be automated lawn mowers, such as tandem mowers or multiple mowers, which can be assigned to mow an area. The mowers can collaborate to automatically perform the service. In addition, by utilizing a collaborative workgroup of different assets as described below, the automatic mowers may work with automated edgers, automated weed whackers, automated refueling vehicle, or the like to accomplish the work assignment. In one embodiment, a geofence, smart stakes, or the like may also be used to delineate the area of operation for the automated devices.

Moreover, although one example illustrates the assets as being two or more of the same or similar kind operating in a location, the assets may be two or more different types of assets that work together to accomplish a common goal. For example, the assets may be a harvester and grain collector that would be able to function together to accomplish a designated work. In another example, the assets may be dredgers, underwater operational assets, or the like operating in a location such as a harbor.

In yet another embodiment, the assets may be a combination of two or more similar assets and one or more different types of assets working within a workgroup to complete a common task. For example, a workgroup may utilize a number of similar and different assets to accomplish the common task of making a road. The workgroup may utilize smart stakes, graters, scrapers, excavators, lawn mowers, dredges, a plurality of compactors and the like to prep the location. Once prepped, the workgroup may use trucks, pavers and a plurality of compactors to build the road.

In one embodiment, first asset 105 and second asset 115 may both be handheld assets, vehicle assets or a combination of a handheld asset and a vehicle asset.

Thus, although a two compactor example is provided herein it is merely for purposes of clarity. Moreover, the discussion simplifies the actual operations of the compactors in the present example as a means to provide a clear and concise explanation of the workgroup relationship without bogging down the example with asset specific operational requirements, characteristics, or the like.

In the present example, first asset 105 is a larger compactor than second asset 115 and as such, is utilized for performing different levels of work and completing different portions of a job. In workgroup 100, first asset 105 and second asset 115 are operating over lanes 125-155 and share information over data path 161. The shared information is defined in more detail in the discussion of FIGS. 1 and 4 herein.

For example, the first asset 105 may provide information about previously rolled lanes 140-155. The information may include surface information such as lanes 140 and 150-155 are now ready for the second asset 115. First asset 105 also informs second asset 115 about the obstacle 171, that lane 145 is not ready for the second asset 115 until the obstacle 171 is cleared. Similarly, the second asset 115 may note that an area rolled by second asset 115 is in need of another pass from the first asset 105.

Figure 3:
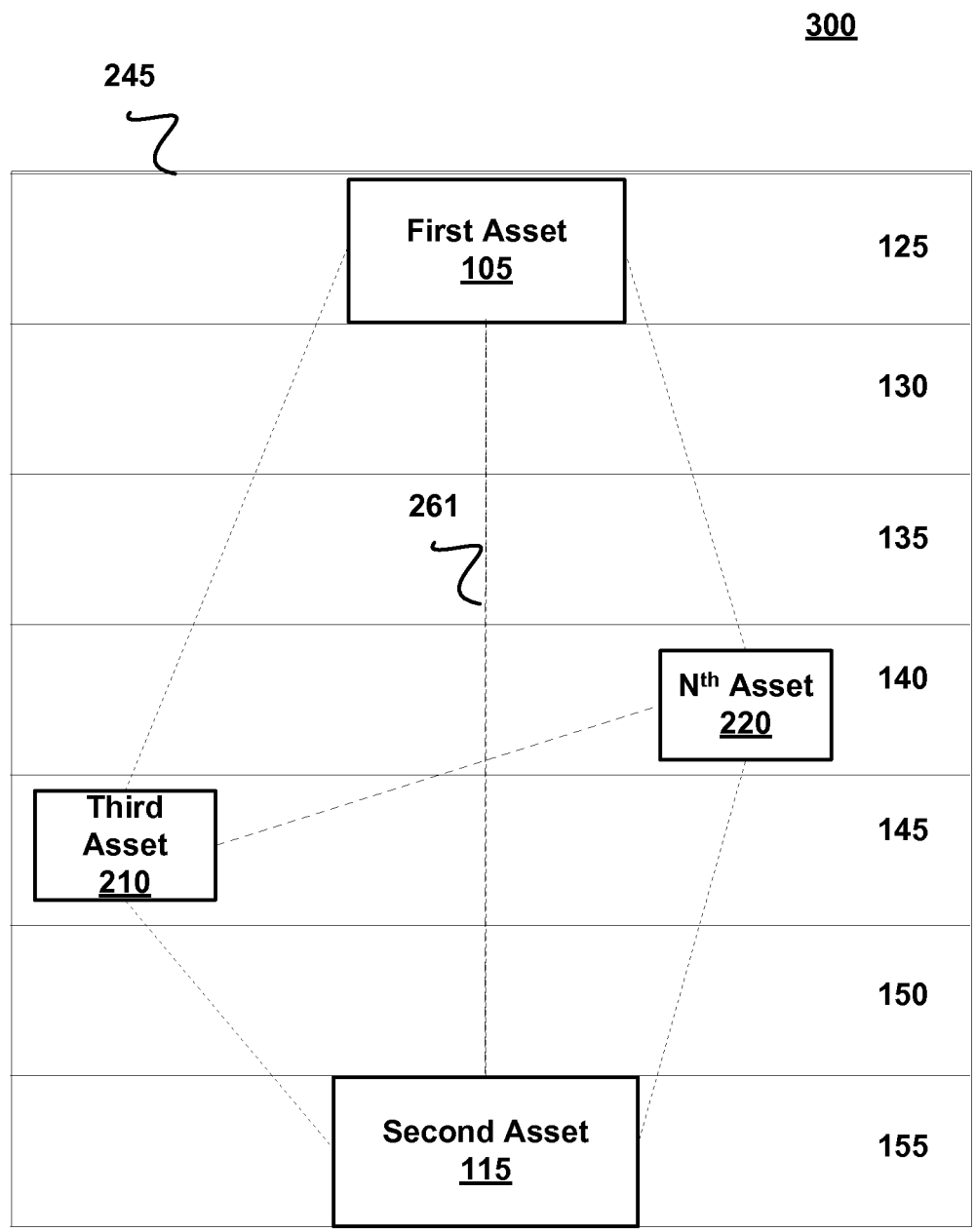
FIG. 3 is a block diagram of an $n^{th}$ asset collaborative sharing workgroup, according to one embodiment of the present technology.

With reference now to FIG. 3, a block diagram of a workgroup 300 having more than two assets is shown. Utilizing the previous example, first asset 105 and second asset 115 are compactors working a construction site. The construction site is defined by the border 245 which may be a geofence or the like. Workgroup 300 also includes a third asset 210 and $n^{th}$ asset 220. In the following example, third asset 210 is a truck with fill material and $n^{th}$ asset 220 is a fixed location asset, such as a stake, geo marker or the like.

As previously described in FIG. 2, first asset 105 and second asset 115 are compactors of different size for performing different levels of work and completing different portions of a job. All members of the workgroup 300 share information as described herein.

When the third asset 210, the fill truck, enters the workgroup boundary 245, the fill truck automatically joins workgroup 300 and passes information to the assets of workgroup 300 including information about the load being carried, such as, size, type etc. Moreover, the workgroup 300 assets pass information to the third asset 210. Based on the automatic passing of information, the user guidance module 315 of third asset 210 may provide guidance to continue to the predetermined location to drop the load, or the workgroup information may cause the route of the fill truck to be automatically updated to a new location that is of higher priority.

For example, the fill truck may have been dispatched to the location with the directions to drop the load by $n^{th}$ asset 220. However, when the fill truck joins the workgroup, the assets provide information including the obstacle 171 of FIG. 2. In the present example, obstacle 171 is a hole that needs to be filled. In other words, upon entering the workgroup 300 and sharing information with the assets within the workgroup, third asset 210 automatically recognizes that some of the material from the truck is needed at location different from the original drop location provided during dispatch.

Thus, user guidance module 315 of third asset 210 can provide an automatic update to the driver such that an appropriate amount of material is dropped at the new location. The third asset 210 can also provide an update to the workgroup regarding the change in drop location and an estimated time that the material will be dropped. Third asset 210 will maintain communications with the other assets of the workgroup throughout the time the third asset 210 is within the workgroup boundary, such that the other assets within the workgroup will be able to update their routes and plans as the materials are delivered from third asset 210.

In so doing, each asset of the workgroup 300 is able to provide and receive consistent updates regarding needs, work accomplished, work assigned but uncompleted, problems, conflict, and the like, without requiring a central management asset to manage the overall work operation.

Figure 4:
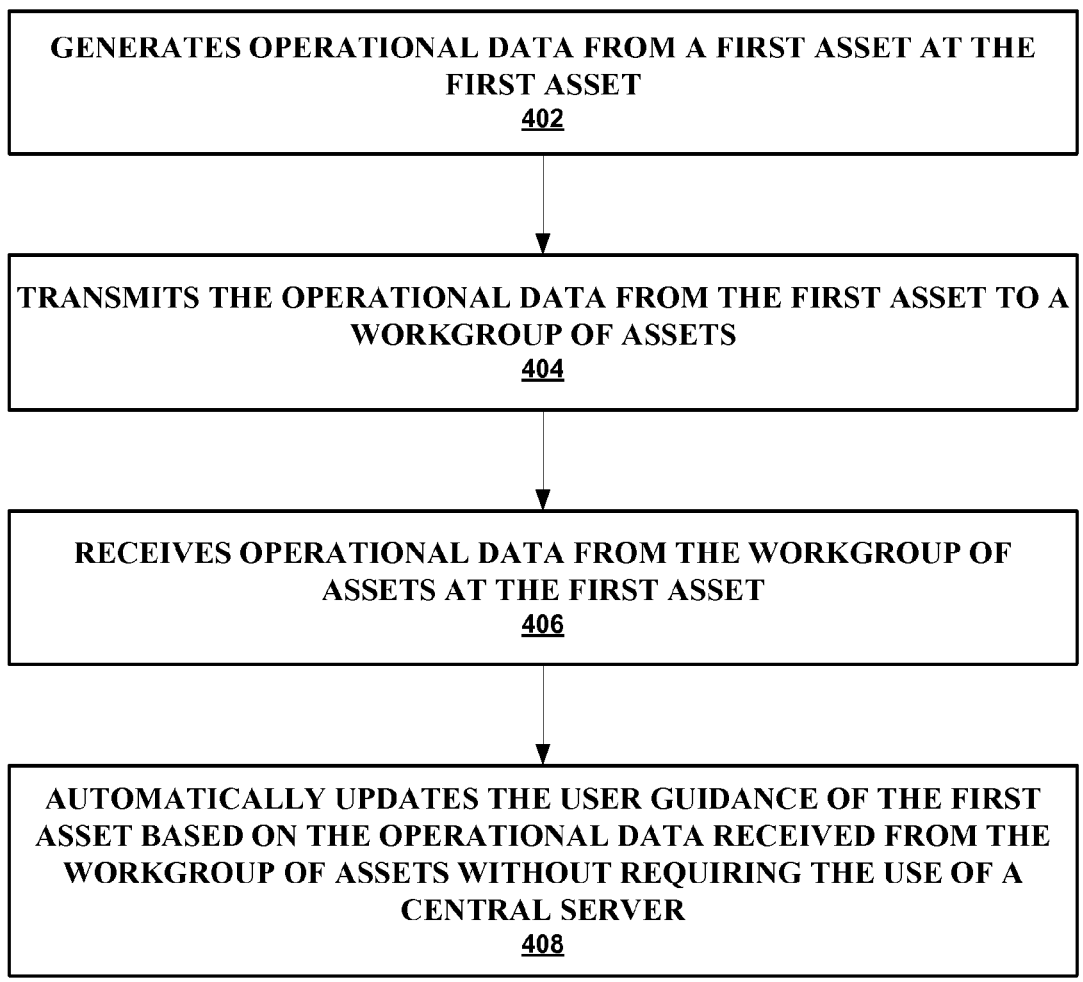
FIG. 4 is a flowchart of a method for sharing data between assets at a worksite, according to one embodiment of the present technology.

Referring now to FIG. 4, a flowchart 400 of a method for sharing data between assets at a worksite is shown, according to one embodiment of the present technology. In one embodiment, flowchart 400 is carried out by processors and electrical components under the control of computer readable and computer executable instructions stored on a non-transitory computer-usable storage medium. The computer readable and computer executable instructions reside, for example, in data storage features such as non-transitory computer-usable volatile and non-volatile memory. In one embodiment, flowchart 400 is performed by system 500 of FIG. 5. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory). In one embodiment, process 400 is carried out by an application on a mobile device.

With reference now to 402 of FIG. 4 and FIG. 1, one embodiment generates operational data from a first asset 105 at the first asset 105. In one embodiment, the operational data includes information from the asset systems monitor 311, the GNSS 312 and the environment monitor 313.

As described herein, asset systems monitor 311 includes information such as, but not limited to, engine information, fuel information, battery information, fault information, operating time, load information, route information and previous work performed. Similarly, GNSS 312 includes information such as but not limited to, location, altitude, time, recognized error, and locations of reduced accuracy. Environment monitor 313 includes information such as but not limited to, weather, humidity, air temperature, material density, surface temperature, layer characteristics, surface characteristics, areas to avoid, obstacles 171 of FIG. 2, and further needs of an area.

With reference now to 404 of FIG. 4 and FIG. 1, one embodiment transmits the operational data from the first asset 105 to the workgroup of assets 115, 210 and 220. For example, by utilizing a peer-to-peer network 261.

Referring now to 406 of FIG. 4 and FIG. 1, one embodiment receives operational data from the workgroup of assets 115, 210 and 220 at the first asset 105. For example, by utilizing a peer-to-peer network 261. In general, the received operational data is similar in form and function to the transmitted operational data. In other words, the received operational data includes information from each of the group consisting of: asset systems monitor 311; GNSS 312 and environment monitor 313 of the other assets in the workgroup.

With reference now to 408 of FIG. 4 and FIG. 1, one embodiment automatically updates a user interface of the first asset 105 with a consolidated information update at the first asset 105 based on the operational data received from the workgroup of assets without requiring the use of a central server. In so doing, each asset of the workgroup is able to provide and receive consistent updates regarding needs, work accomplished, work assigned but uncompleted, and the like, without requiring a central management asset to manage the overall work operation.

The following examples are provided based on the discussion provided herein including the discussion of Flowchart 400.

In one example, the asset workgroup includes a plurality of compactors and a foreman's handheld asset. The workgroup may also optionally include any paver(s) asset information.

In one embodiment, user guidance module 315 develops a multi-machine area map from the consolidated information.

In so doing, the movement of the assets can be inferred from the multi-machine area map. Additionally, the user guidance module 315 created multi-machine area map may also be used to graphically represent one or more aspects of the covered area including; The coverage of the surfaces, such as pass counts of multiple for compaction, where a target pass count of the whole surface is specified by the owner.

In addition, characteristics of the surface or layer that multiple machines touch may also be represented. For example, these characteristics may include temperature and compaction measurement.

From the multi-machine area map a suggested next routing for the machine can be suggested or automatically employed. For example, one embodiment may suggest a rolling pattern for multiple compactors taking into account surface characteristics and pass counts.

Since the paver(s) also shared passed location and asphalt temperature with the compactors, shared temperature maps may also be generated at each asset. Moreover, the multi-machine area map provides a networked map of the job done so far as well as the jobs left to complete. This information is also automatically generated by the foreman's handheld asset.

In addition, since the assets share all information with all assets in the workgroup, other asset types within the workgroup, e.g., assets that may be waiting for employment or utilization, can prepare for their next action, determine if a break is viable, refill or reload to reduce idle time at the worksite, and the like.

For example, assume multiple soil compactors roll a surface and measure compaction values. The shared information is generated at an asset utilized by an excavator person to identify any soft spots that should be dug and refilled with load bearing material. In another embodiment, the shared information generated at an asset utilized by an owner or company inspector could again identify where the softest spots are so core samples at the softest locations can be taken for density measurement or the like. In so doing, better coordination between assets is established and more efficient operation can be achieved thereby saving both time and money.

Computer System

Figure 5:
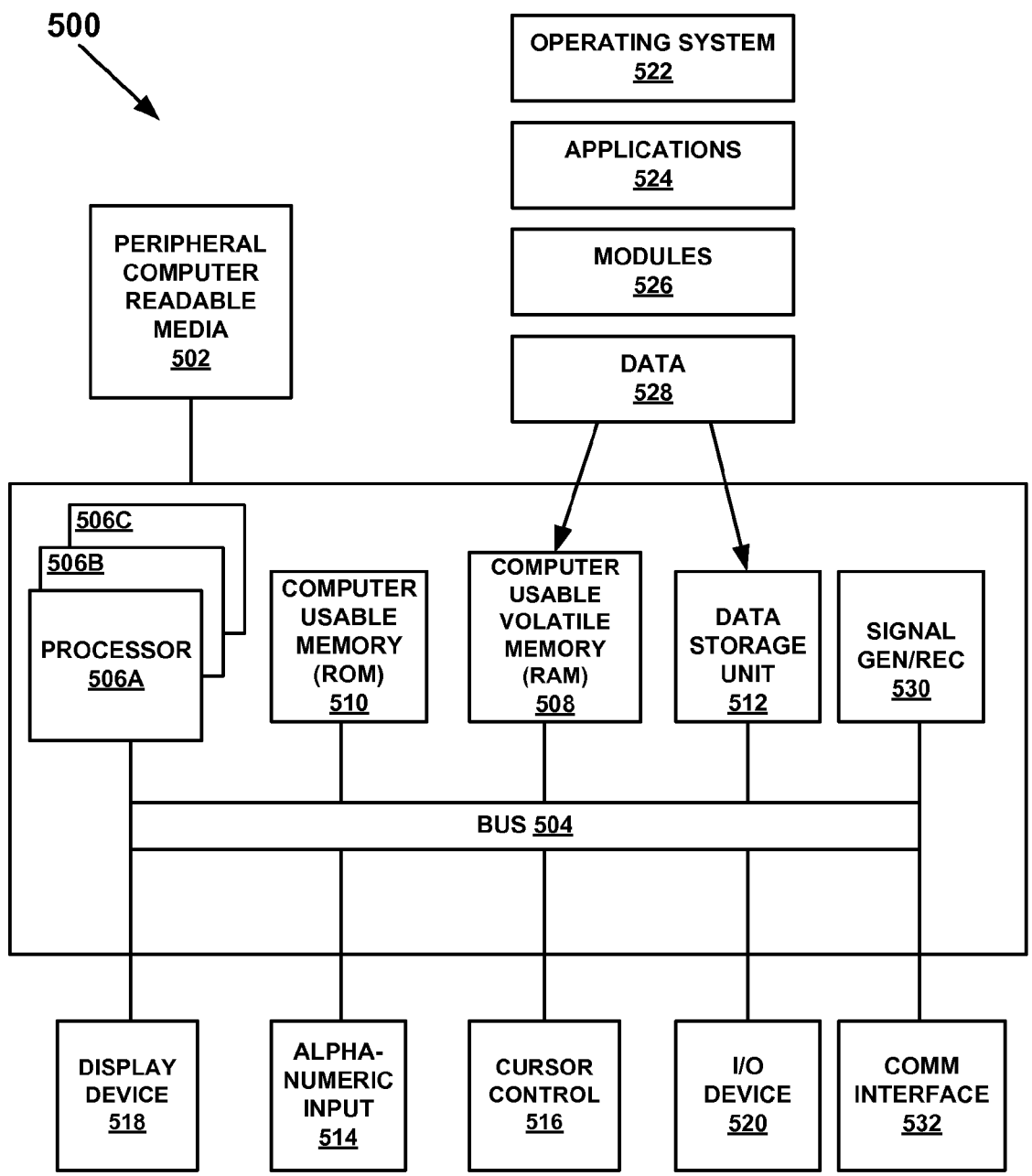
FIG. 5 illustrates a diagram of an example computer system upon which embodiments of the present technology may be implemented.

With reference now to FIG. 5, portions of the technology for providing a communication composed of non-transitory computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be use in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500. For example, a method of modifying user interface 225A of device 115A may be applied to operating system 522, applications 524, modules 526, and/or data 528.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

GNSS Receiver

Figure 6:
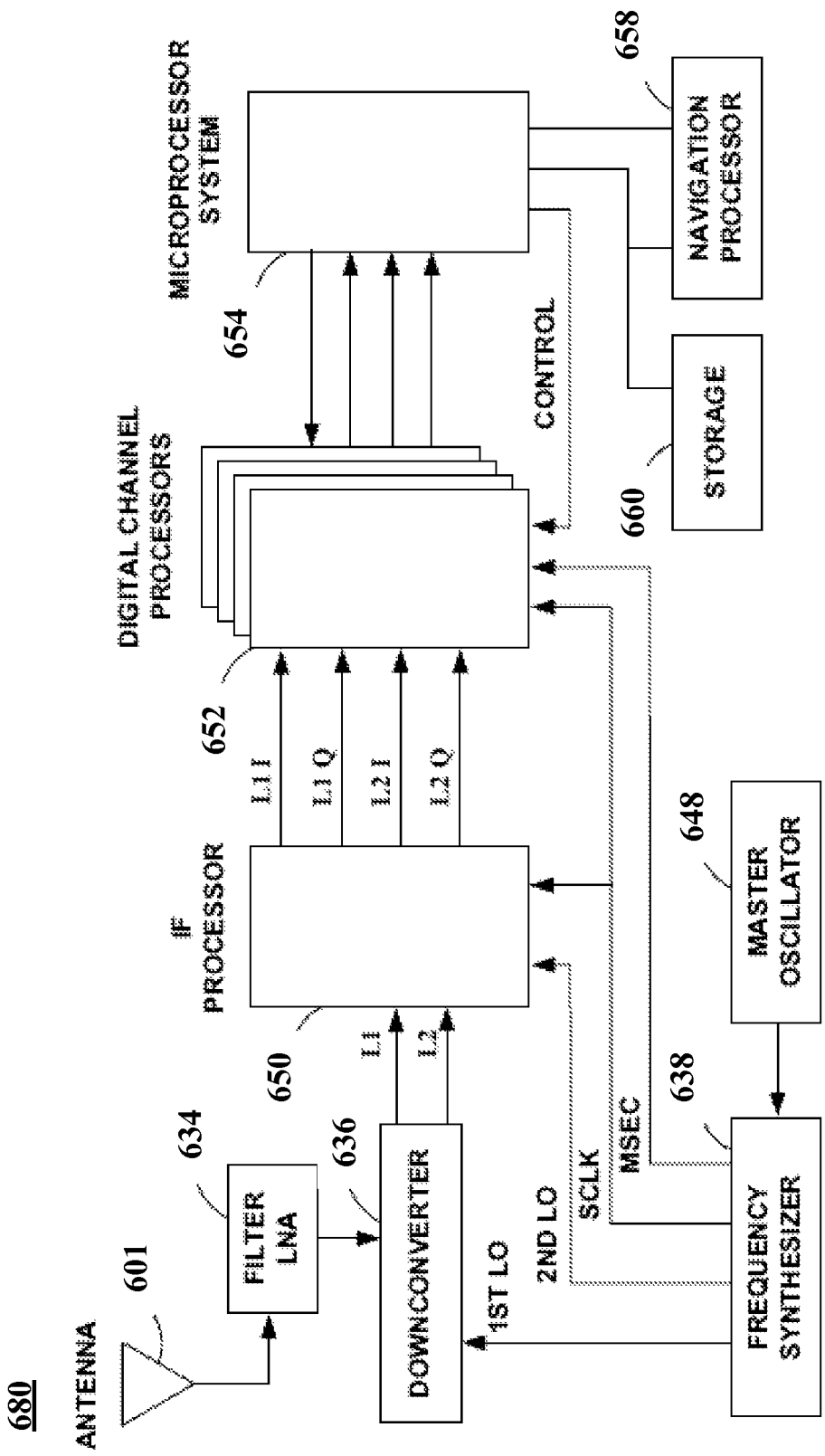
FIG. 6 is a block diagram of an example global navigation satellite system (GNSS) receiver which may be used in accordance with one embodiment of the present technology.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or nonvolatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A collaborative sharing workgroup comprising:
a workgroup comprising a plurality of assets;
an integrated manager module fixedly coupled with each asset, the integrated manager module comprising:
an asset systems monitor;
a global navigation satellite system (GNSS) position information monitor; and
an environment information monitor;
a communications module fixedly coupled with each asset, the communications module automatically shares information from each integrated manager module to each of the plurality of assets in the workgroup and receives the shared information from each of the plurality of assets in the workgroup, wherein the asset system monitor provides asset information selected from the group consisting of: engine information, battery information, fuel information, fault information, operating time, load information, route information and previous work performed; and
a user guidance module coupled with each asset, the user guidance module utilizes the shared information to automatically update guidance information for each asset, the user guidance module operates independently on each asset in the workgroup without requiring a central managing device.

2. The workgroup of claim 1 further comprising:
a handheld device having an integrated computing system for monitoring GNSS position information and environment information.

3. The workgroup of claim 1 wherein the communications device is a multicast communications device.

4. The workgroup of claim 1 wherein the workgroup network is an ad-hoc peer-to-peer network with no defined master.

5. The workgroup of claim 1 wherein each of said plurality of assets within the workgroup performs its own computing.

6. The workgroup of claim 1 wherein the asset relationship is a thin or thick client relationship wherein some of said plurality of assets within the workgroup perform more computer processing than other of said plurality of assets.

7. The workgroup of claim 1 wherein an asset is assigned to the workgroup based on the assigned area of operation of the asset.

8. The workgroup of claim 1 wherein membership to the workgroup is based on assets operating within a reference range.

9. The workgroup of claim 1 wherein an asset automatically joins the workgroup after crossing a defined boundary location for the workgroup.

10. The workgroup of claim 1 wherein the GNSS position information is selected from the group consisting of: location, altitude, time, recognized error, and locations of reduced accuracy.

11. The workgroup of claim 1 wherein the environment information is selected from the group consisting of: weather, humidity, air temperature, material density, surface temperature, layer characteristics, surface characteristics, areas to avoid, obstacles, and further needs of an area.

12. A method for exchanging data between assets at a worksite, said method comprising:
generating operational data from a first asset at the first asset; wherein the operational data comprises environment information selected from the group consisting of: weather, humidity, air temperature, material density, surface temperature, layer characteristics, surface characteristics, areas to avoid, obstacles, and further needs of an area;
transmitting the operational data from the first asset to a workgroup of assets;
receiving operational data from the workgroup of assets at the first asset; and
automatically updating a user interface of the first asset with a consolidated information update at the first asset based on the operational data received from the workgroup of assets without requiring the use of a central server.

13. The method of claim 12 further comprising:
transmitting the operational data from the first asset to a workgroup utilizing a peer-to-peer network.

14. The method of claim 12 further comprising:
generating operational data from a second asset at the second asset;
transmitting the operational data from the second asset to the workgroup of assets;
receiving the operational data from the workgroup of assets at the second asset; and
automatically updating a user interface of the second asset to provide a consolidated information update at the second asset based on the operational data received from the workgroup of assets without requiring the use of a central server.

15. The method of claim 12 wherein the operational data includes information from each of the group consisting of: asset systems information, global navigation satellite system (GNSS) position information and environment information.

16. A collaborative sharing workgroup comprising:
a workgroup comprising a plurality of assets;
an integrated manager module fixedly coupled with each asset, the integrated manager module comprising:
an asset systems monitor;
a global navigation satellite system (GNSS) position information monitor to provide GNSS position information selected from the group consisting of: location, altitude, time, recognized error, and locations of reduced accuracy; and
an environment information monitor;
a communications module fixedly coupled with each asset, the communications module automatically shares information from each integrated manager module to each of the plurality of assets in the workgroup and receives the shared information from each of the plurality of assets in the workgroup; and
a user guidance module coupled with each asset, the user guidance module utilizes the shared information to automatically update guidance information for each asset, the user guidance module operates independently on each asset in the workgroup without requiring a central managing device.

17. The workgroup of claim 16 further comprising:
a handheld device having an integrated computing system for monitoring GNSS position information and environment information.

18. The workgroup of claim 16 wherein the communications device is a multicast communications device.

19. The workgroup of claim 16 wherein the workgroup network is an ad-hoc peer-to-peer network with no defined master.

20. The workgroup of claim 16 wherein each of said plurality of assets within the workgroup performs its own computing.

21. The workgroup of claim 16 wherein the asset relationship is a thin or thick client relationship wherein some of said plurality of assets within the workgroup perform more computer processing than other of said plurality of assets.

22. The workgroup of claim 16 wherein an asset is assigned to the workgroup based on the assigned area of operation of the asset.

23. The workgroup of claim 16 wherein membership to the workgroup is based on assets operating within a reference range.

24. The workgroup of claim 16 wherein an asset automatically joins the workgroup after crossing a defined boundary location for the workgroup.

* * * * *